United States Patent [19]
Johnson

[11] Patent Number: 5,647,880
[45] Date of Patent: Jul. 15, 1997

[54] PRESSURE RELIEF VALVE WITH FILTER

[75] Inventor: Jay T. Johnson, Concrod, N.C.

[73] Assignee: Ingersoll-Rand Company, Woodcliff Lake, N.J.

[21] Appl. No.: 522,217

[22] Filed: Aug. 31, 1995

[51] Int. Cl.⁶ ..................................... B01D 46/00
[52] U.S. Cl. ..................... 55/310; 55/367; 55/385.4; 95/284
[58] Field of Search .................. 55/213, 215, 218, 55/309, 310, 367, 385.4, 425; 95/266, 284, 19; 96/193

[56] References Cited

U.S. PATENT DOCUMENTS

| | | |
|---|---|---|
| 1,828,626 | 10/1931 | Swendeman . |
| 2,314,986 | 3/1943 | Johnson . |
| 2,334,971 | 11/1943 | Walker . |
| 2,555,742 | 6/1951 | Grue . |
| 2,591,432 | 4/1952 | Hoerner . |
| 3,369,348 | 2/1968 | Davis . |
| 3,678,662 | 7/1972 | Grote . |
| 3,728,848 | 4/1973 | Vest, Jr. . |
| 4,190,426 | 2/1980 | Ruschke ................. 55/310 |
| 4,274,844 | 6/1981 | Baughman et al. . |
| 4,441,871 | 4/1984 | Boller .................... 55/309 |
| 4,968,332 | 11/1990 | Maher .................... 55/385.4 |
| 5,279,629 | 1/1994 | Stueble .................. 95/284 |
| 5,286,283 | 2/1994 | Goodell . |
| 5,294,236 | 3/1994 | Baird . |
| 5,350,513 | 9/1994 | Markowitz . |

*Primary Examiner*—C. Scott Bushey
*Attorney, Agent, or Firm*—Michael M. Gnibus

[57] ABSTRACT

A pressure relief valve for both reducing pressure in a vessel when the pressure of a mixed media combination made up of a mixture of gaseous and nongaseous components and contained in the vessel is at a relief valve actuating pressure, and for filtering nongaseous components from a mixed media combination flowed from the valve. The valve includes a housing with an inlet and a discharge port. The housing inlet is disposed in mixed media combination receiving communication with the vessel. The housing defines a housing chamber and the housing also includes a valve member movable within in the chamber between an occluding position, relative to the inlet when the vessel pressure is not at the actuating pressure, and a non-occluding position, relative to the inlet, when the vessel pressure is at the actuating pressure. The pressure relief valve also includes a filter device expandable by the mixed media combination when the vessel pressure is at the actuating pressure. The filter device is disposed in mixed media receiving relation with the discharge port, and filters the nongaseous components from the mixed media combination and permits the gaseous components to flow through the filter device.

11 Claims, 3 Drawing Sheets

PRESSURE RELIEF VALVE WITH FILTER

FIELD OF THE INVENTION

This invention generally relates to a pressure relief valve for a pressure vessel such as a non-fired pressure vessel, and more particularly to a pressure relief valve for a non-fired pressure vessel where the pressure relief valve includes a filter for filtering fluid and particulate matter entrained with gas discharged through the pressure relief valve.

Non-fired pressure vessels are fixed volume vessels that do not contain contents above a certain temperature. Such contents is typically comprised of a gas combined with liquid and/or particulate matter (solid). An example of a non-fired pressure vessel is a separator tank that is used in a compressed gas system to separate particulate matter and liquid, such as oil, from a compressed gas such as air.

The contents of a non-fired pressure vessel is maintained in an interior vessel chamber under high pressure and, as a result, a non-fired pressure vessel is typically adapted to include a pressure relief valve that is in fluid communication with the interior vessel chamber. Conventional pressure relief valves typically include an inlet, a discharge port and a valve member that opens and closes the inlet.

The valve member is designed to open the inlet when the pressure of the contents in the vessel chamber equals or exceeds a predetermined threshold pressure. When the pressure equals or exceeds the threshold pressure, the valve opens and a gas stream, that includes any liquid and particulate matter entrained with the gas, flows out the pressure relief valve discharge port, thereby reducing the pressure in the vessel to a level below the threshold pressure. The combination of gas, liquid and particulate matter that is discharged from the pressure relief valve flows from the discharge port, mixes with ambient air and contaminates the air.

It would be beneficial to incorporate features into conventional pressure relief valves, which would filter particulate matter and liquid from the gas when the gas/liquid/particulate combination is flowed from the pressure relief valve discharge port.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a pressure relief valve for both reducing pressure in a vessel chamber when the pressure in the chamber containing a mixed media combination comprised of gaseous and nongaseous components, is at a relief valve actuating pressure, and filtering nongaseous components from the mixed media combination flowed from the valve.

The pressure relief valve is comprised of a housing with an inlet, and a discharge port, the housing inlet is disposed in mixed media combination receiving communication with the vessel chamber, the housing defines a housing chamber and further includes a valve member movable within in the housing chamber between an occluding position, relative to the inlet when the vessel chamber pressure is not at the actuating pressure, and a non-occluding position, relative to the inlet, when the vessel chamber pressure is at the actuating pressure.

The pressure relief valve also includes filter means expandable by the mixed media combination when the vessel chamber pressure is at said actuating pressure, the filter means is disposed in mixed media receiving relation with the discharge port, the filter means is for filtering the nongaseous components from the mixed media combination and permitting the gaseous components to pass through the filter means.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION OF THE PREFERRED EMBODIMENT

Figure 1:
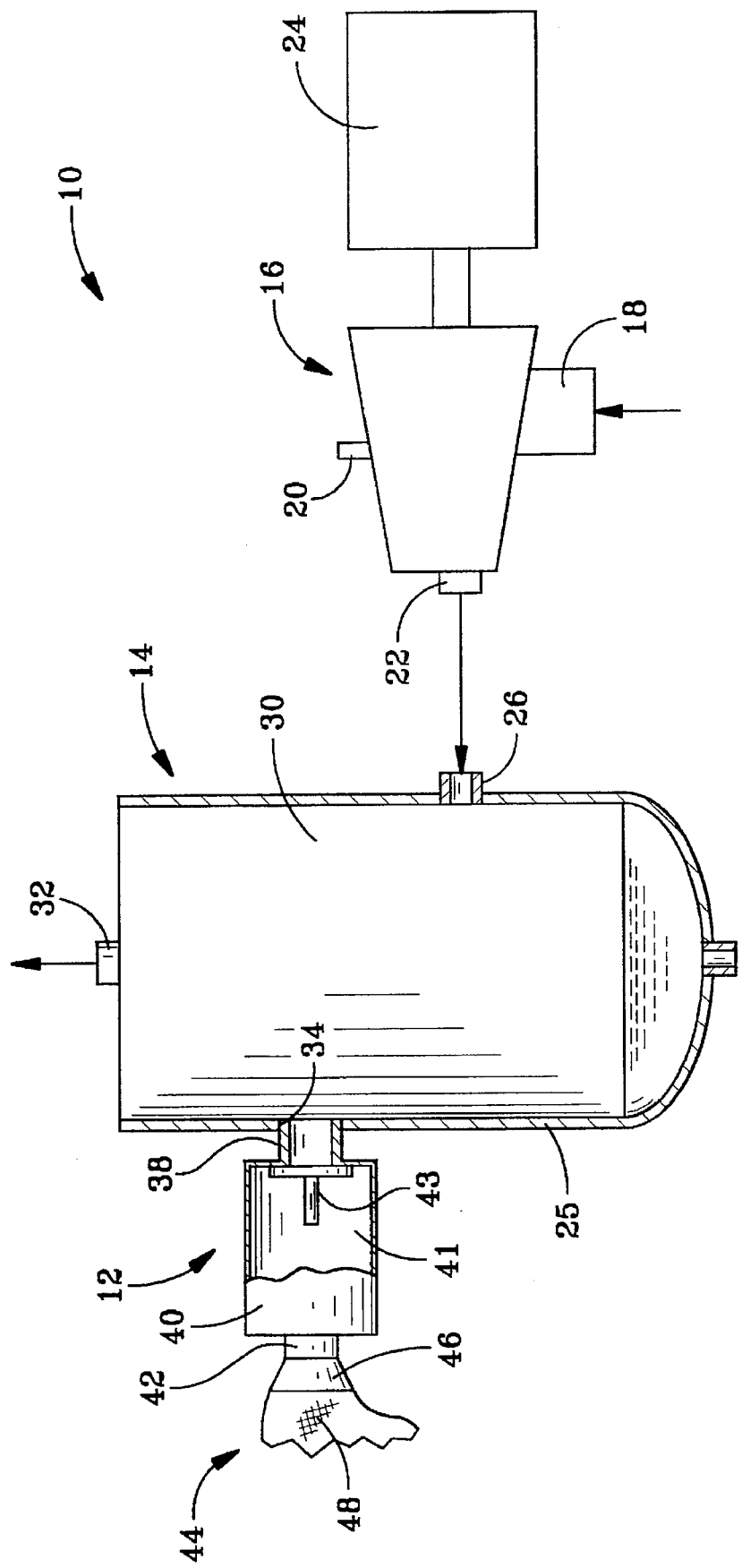
FIG. 1 is a schematic diagram illustrating a compressed air system which includes the present invention where the pressure in a pressure vessel is not at an actuating pressure.

Referring now to the drawings, wherein similar reference characters designate corresponding parts throughout the several views, FIG. 1 illustrates generally at 10 a compressed gas system which includes a pressure relief valve 12 for reducing pressure in vessel 14 when the pressure of the contents in the vessel equals or exceeds a predetermined threshold pressure. Hereinafter the term "vessel" shall mean any device or article of manufacture that is adapted to hold a volume of matter under pressure. The volume of matter may be comprised of any combination of gas, liquid and particulate matter.

The vessel is flow connected to gas compressor 16. In the preferred embodiment, the compressor is a lubricated compressor such as an oil-flooded rotary screw compressor for example. However, the compressor may also be any of the non-lubricated compressors well known in the art.

A suitable, conventional prime mover 24 drives compressor 16. The prime mover may be an electric motor or a diesel engine.

Compressor 16 includes an inlet 18 for supplying a relatively low pressure gas, such as air, to the compressor; a compression chamber (not shown) where the low pressure gas is compressed; lubricant inlet 20 in liquid communication with the compression chamber and through which a lubricant, such as oil, is introduced into the compression chamber to cool the compressor; and a discharge port 22 through which the combination comprised of compressed gas and lubricant entrained with the gas, flows from the compressor.

Gas drawn through inlet 18 into the compression chamber is combined with lubricant that is introduced into the chamber through lubricant inlet 20. Additionally, other nongaseous components including other liquids such as water for example, and also particulate matter (solid) may be entrained with the gas. In this way, a mixed media combination comprised of gas/liquid, gas/solid or gas/liquid/solid is flowed from compressor discharge port 22. For clarity, hereinafter the term "mixed media combination" shall mean any combination of gaseous and nongaseous components including any gas/liquid, gas/solid or gas/liquid/solid combination.

In the preferred embodiment, vessel 14 is a fixed volume, non-fired vessel that is flow connected in compressed gas receiving relation to discharge port 22 as shown in FIG. 1. The non-fired vessel is a conventional separator tank which separates any nongaseous components of the mixed media combination from the compressed gas.

The non-fired pressure vessel generally includes wall 25 which defines chamber 30, an inlet 26 extending through the wall and through which the mixed media combination flows into the chamber, and a discharge port 32 through which gas that is essentially dry and substantially free of particulate matter flows from the separator tank. Vessel 14 is connected in compressed gas supplying relation to a service valve (not shown) for use by an object of interest such as a pneumatic tool. Vessel 14 also includes opening 34 which extends through the vessel wall to accommodate liquid communication with the chamber 30. In the preferred embodiment, opening 34 is threaded in a conventional manner. In order to be used with compressor 16, the vessel 14 should be able to withstand vessel chamber operating pressures between 50%–150% of the normal operating pressure of the compressor.

Pressure relief valve 12 is disposed along the outside of vessel 14 and is flow connected to the vessel at opening 34. See FIG. 1. The pressure relief valve includes a housing 40 which defines housing chamber 41. The housing includes an inlet 38 which is in mixed media receiving communication with chamber 30 and through which the pressurized mixed media flows into the chamber 41, a discharge port 42 through which the mixed media combination flows from the chamber and a valve member 43 movable within the chamber between occluding and non-occluding positions relative to valve inlet 38. Valve 12 is of conventional design and is well known in the art. Valve member 43 is biased by a spring or other conventional means to remain in the substantially occluding position until the pressure of the mixed media combination in chamber 30 is at a pressure relief valve actuating pressure which equals or exceeds a predetermined threshold pressure for vessel 14. The threshold pressure is a predetermined pressure limit for the chamber 30. The threshold pressure may be anywhere from 200–350 psi, for example.

The pressure relief valve is flow connected to the vessel at valve inlet 38. The valve inlet is adapted to be threadably connected to vessel 14 at threaded opening 34. The valve inlet is provided with external threads which are of the dimensions required to engage the threaded portion of opening 34. The pressure relief valve may also be connected to the vessel using other conventional methods such as a bolt or screw connection, a weld connection or by a clamping apparatus. Discharge port 42 includes a conventional threaded portion along the interior wall of the pressure relief valve discharge port.

Filter means 44 is removably connected to pressure relief valve 12 at discharge port 42. The filter means includes a connection member 46 and an expandable, gas permeable filter 48.

The connection member has a body with a hollow interior portion and is adapted to be removably connected to discharge port 42. The connection member includes a conventional thread along the connection member exterior portion, and the threaded portion is of the dimensions required to produce the desired threaded connection with the discharge port 42. Although the connection member body is shown in the FIGS. 1–4 as being essentially conical, it is anticipated that the member could assume a variety of configurations including, but not limited to, annular and cylindrical configurations. The connection member may be removably connected to the pressure relief valve discharge port by another conventional means for example by discrete connection members such as bolts, screws or the like, or by a clamping apparatus.

Figure 3:
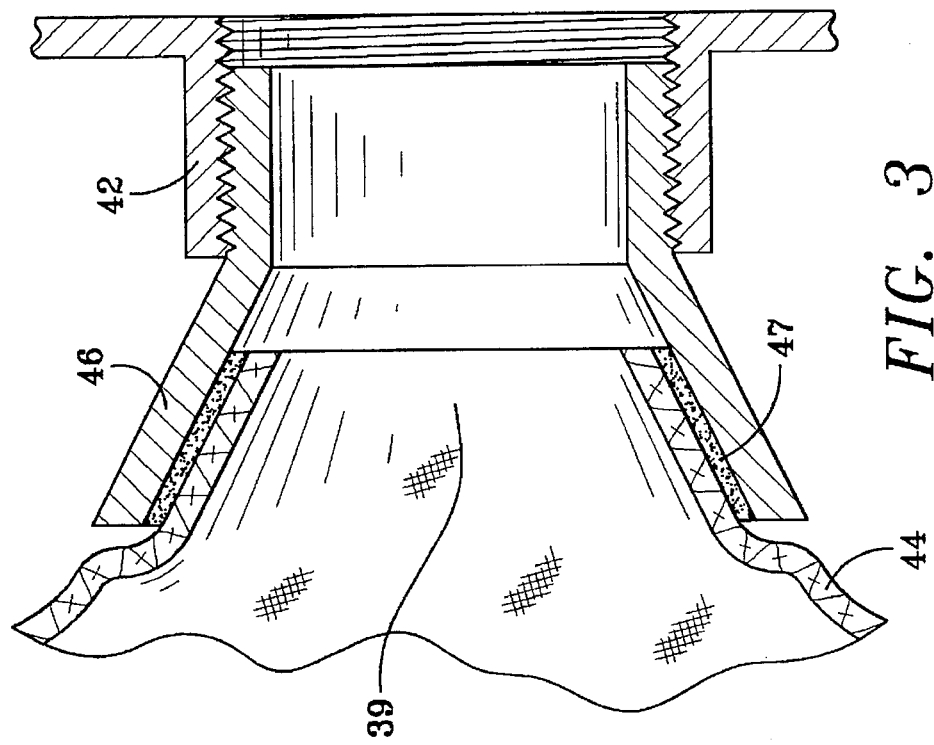
FIG. 3 is an enlarged, sectional view of a portion of the schematic diagram of FIG. 2.

Filter 48 is an inflatable, gas permeable bag having an open end 39 and is joined to the connection member at the open end, along the interior of the connection member, as shown in FIG. 3, so that the bag is in mixed media receiving relation with the discharge port 42. Filter 48 has a bag shape in order to accommodate the mixed media combination that flows from the discharge port 42 under relatively high pressure. The filter bag may have a volumetric capacity between 132 U.S. gallons ($0.5M^3$)–13,200 U.S. gallons ($50M^3$) depending on the capacity of vessel 14. The filter is expandable in response to the mixed media combination that flows through the valve when the pressure in the valve is at the pressure relief valve actuating pressure.

Figure 4:
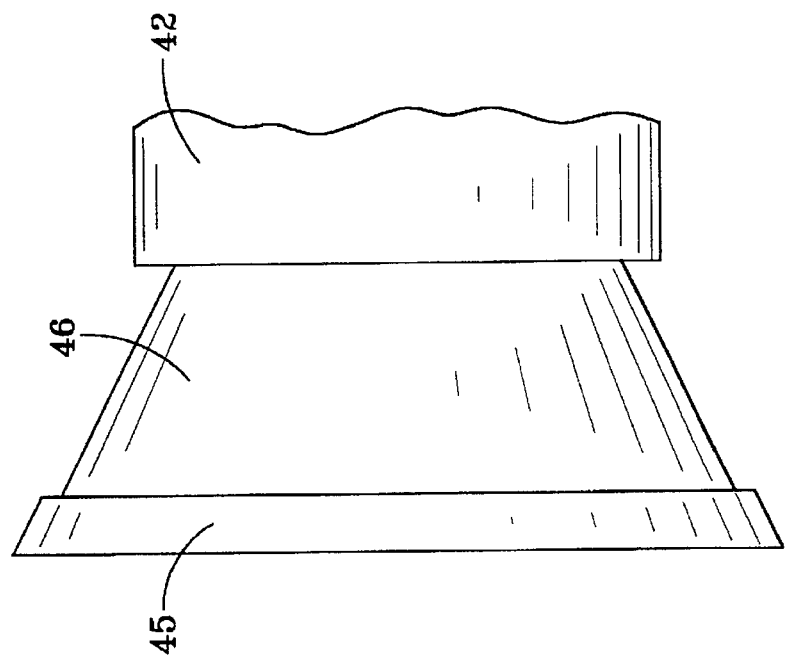
FIG. 4 is an enlarged view of a portion of the schematic diagram of FIG. 1, further including a cap fitted on the connection member.

The filter may be joined to the interior of the connection member in any conventional manner by using a bonding agent such as an adhesive layer 47 as shown in FIG. 4, or a number of discrete fasteners (not shown). The filter should be connected to the connection member in such a manner so that if the filter becomes clogged or otherwise inhibits the free flow of gas through the filter, and causes a pressure drop across the relief valve inlet port that exceeds a predefined safe pressure drop, the filter will break away and disconnect from the connection member and thereby permit the free flow of gas/liquid/solid combination from the valve 12.

Filter 48 is sufficiently pliable to enable the filter to be condensed or balled up into a relatively small package and stored in the hollow interior of connection member 46 when not in use, as shown in FIG. 1.

The filter is gas permeable. The gas permeable filter is porous and permits gas to permeate the filter and blocks permeation of all or substantially all particulate matter in a mixed media combination that flows through the pressure relief valve into the filter.

The filter is absorbent and absorbs liquid in the mixed media combination. In this way, it is believed that the filter will absorb all or a substantial volume of the liquid in the mixed media combination that flows through the pressure relief valve.

The filter 48 is made from an absorbent, pliable and gas permeable material such as a cotton based material. However it is contemplated that the filter may be made from any absorbent, man made or natural woven material which provides the required pliability, absorbency and permeability.

When the compressed air system 10 is not in use or is being transported to a job site, cap 45 may be placed on the end of the connection member, as shown in FIG. 4, to cover the end of the connection member and thereby shield the filter 48 and also keep the filter balled up in the hollow interior of the connection member. Before the compressor is started, cap 45 is removed from connector member 46 exposing filter 48 which was previously balled up and inserted into the hollow interior of the connection member.

In operation, prime mover 24 drives compressor 16 which compresses gas drawn into the compressor through inlet 18.

Lubricant is introduced into the compression chamber and is entrained with the gas. The compressor discharges the compressed gas through discharge port 22 to the inlet 26 of vessel 14 and into pressure chamber 30. Additional liquid and particulate matter may be entrained with the compressed gas and lubricant to produce a mixed media combination which flows into the compression chamber.

During operation, when the pressure in chamber 30 is not at the actuating pressure, the valve 43 is in the substantially occluding position relative to pressure relief valve inlet 38, as shown in FIG. 1. The vessel 14 separates liquid and particulate matter from the compressed gas which is flowed out vessel discharge port 32. The balled up filter absorbs any liquid that may, over time leak out of the vessel and pressure relief valve, and blocks the outward flow of particulates from the valve.

When the pressure in the chamber is at the actuating pressure and therefore, equals or exceeds a predetermined threshold pressure, valve 43 is forced to the substantially non-occluding position by the mixed media combination in chamber 30. See FIG. 2. As valve inlet 38 opens, the mixed media combination flows through the opening 34 and into housing chamber 41. The pressurized mixed media combination continues through housing chamber 41, out discharge port 42 and into filter 48. The mixed media combination urges the filter out of the connection member interior and expands the previously balled up filter as shown generally in FIG. 2.

Figure 2:
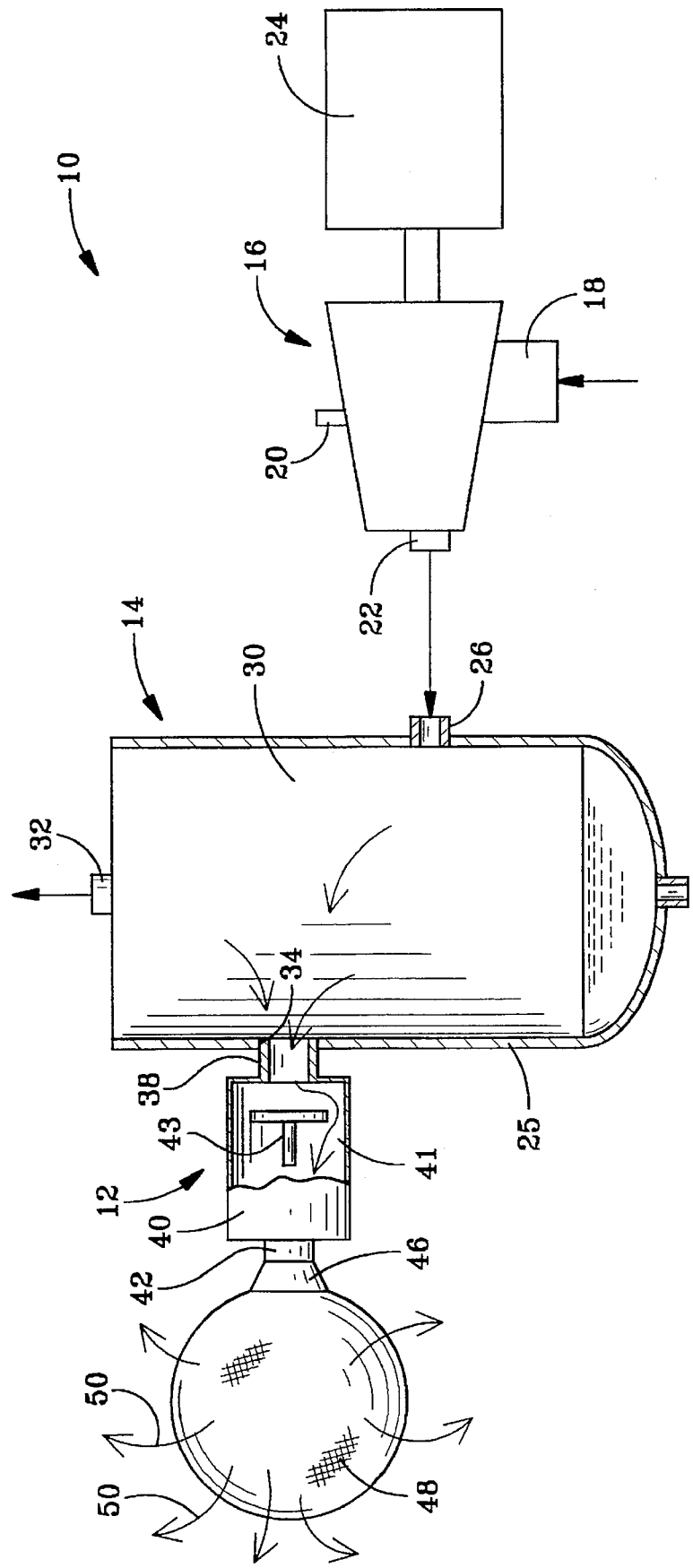
FIG. 2 is a schematic diagram of the compressed air system of FIG. 1 where the pressure in the pressure vessel is at an actuating pressure.

Gaseous components of the mixed media combination flow through the gas permeable filter, in the direction indicated by arrows 50 in FIG. 2, and mix with ambient air. The filter traps all or substantially all of the particulate matter in the mixed media combination, in the filter. All or substantially all of the liquid in the mixed media combination is absorbed by the filter. In this way, the gas that flows from the filter is essentially dry and substantially particulate free.

Valve 43 remains open until the pressure of the contents of the vessel chamber 30 is not at the actuating pressure. After the valve is repositioned to the substantially occluding position thereby interrupting the outward flow of the mixed media combination, the filter becomes limp and hangs from the connection member.

The prime mover and compressor are then stopped, and the used filter means is disconnected from the pressure relief valve discharge port and is disposed. A new, unused filter means 44 is then connected to the discharge port of the pressure relief valve.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A pressure relief valve for both reducing pressure in the chamber of a vessel when the pressure of a mixed media combination comprised of gaseous and nongaseous components contained in the vessel chamber causes the vessel chamber pressure to be at a relief valve actuating pressure, and filtering nongaseous components from said mixed media combination, said pressure relief valve comprising:

a) a housing having an inlet port and a discharge port, said housing inlet port disposed in mixed media combination receiving communication with the vessel chamber, said housing defining a housing chamber and further including a valve member movable in the chamber between an occluding position, relative to the inlet when the vessel chamber pressure is not at the actuating pressure, and a non-occluding position, relative to the inlet, when the vessel chamber pressure is at the actuating pressure; and b) filter means expandable by said mixed media combination when the vessel chamber pressure is at said actuating pressure, said means disposed in mixed media receiving relation with said discharge port, said filter means for filtering the nongaseous components from the mixed media combination and permitting said gaseous components to flow through said filter means.

2. The pressure relief valve as claimed in claim 1 wherein said filter means is comprised of a connection member and a filter member joined to the connection member.

3. The pressure relief valve as in claim 2, wherein said filter member is a filter bag.

4. The pressure relief valve as in claim 2, wherein said filter member is made from a pliable, absorbent, gas permeable material.

5. A combination comprising:

a) a gas compressor having an inlet for receiving gas and a discharge port through which a mixed media combination comprised of gaseous and nongaseous components flows from the compressor;

b) a vessel having a wall which defines a chamber for containing the mixed media combination under pressure, said vessel having an inlet disposed in mixed media combination receiving relation with the compressor discharge port; and c) a pressure relief valve comprising a housing defining a housing chamber, a housing inlet and a housing discharge port said housing inlet adapted to be flow connected to said vessel so that said housing inlet is disposed in mixed media combination receiving relation with said vessel; a valve member movable in said housing chamber between a substantially occluding position relative to said housing inlet when the chamber pressure is not at a pressure relief valve actuating pressure, and a substantially non-occluding position relative to the inlet when the chamber pressure is at said actuating pressure; and filter means expandable by said mixed media combination when the pressure is at the actuating pressure, said means for filtering nongaseous components from said mixed media combination and permitting said gaseous components to flow through said filter means.

6. The combination as claimed in claim 5, wherein said compressor is an oil-flooded rotary screw compressor.

7. The combination as claimed in claim 5, wherein said vessel is a non-fired pressure vessel.

8. The combination as claimed in claim 7, wherein said vessel is a separator tank.

9. The combination as claimed in claim 5, wherein said filter means is removably connected to said discharge port and is comprised of a connection member having an interior, and a filter member attached to the interior of the connection member and adapted to be located substantially within said interior when said valve is in the substantially occluding position and substantially outside said interior when said valve is in said substantially non-occluding position.

10. The combination as claimed in claim 9, wherein said filter member is a filter bag that is made from a gas permeable absorbent material.

11. The combination as claimed in claim 9, wherein a cap is adapted to close the interior of the connection member.

* * * * *